United States Patent [19]
Takamatsu et al.

[11] Patent Number: 4,678,845
[45] Date of Patent: Jul. 7, 1987

[54] MIXED POLYCARBONATE RESIN COMPOSITION

[75] Inventors: Masayoshi Takamatsu, Hino; Kouji Hashimoto, Matsuyama; Akiyoshi Manabe, Matsuyama; Hideyuki Ichihana, Matsuyama, all of Japan

[73] Assignee: Teijin Chemicals, Ltd., Tokyo, Japan

[21] Appl. No.: 735,169

[22] Filed: May 17, 1985

[30] Foreign Application Priority Data

May 17, 1984 [JP] Japan .................................. 59-97516

[51] Int. Cl.$^4$ ............................................. C08L 69/00
[52] U.S. Cl. .................................. 525/462; 524/611; 525/439; 525/469; 528/204
[58] Field of Search ........................ 525/462; 528/204; 524/611

[56] References Cited

U.S. PATENT DOCUMENTS 4,446,285  5/1984  Mark et al. ........................... 528/204
4,520,187  5/1985  Mark et al. ........................... 528/204

FOREIGN PATENT DOCUMENTS 3423864  1/1985  Fed. Rep. of Germany .

Primary Examiner—Harold D. Anderson
Attorney, Agent, or Firm—Sherman and Shalloway

[57] ABSTRACT

A polycarbonate resin composition comprising a blend of (A) 1 to 90% by weight of a polycarbonate resin derived from 2,2-bis(4-hydroxyphenyl)propane and (B) 10 to 99% by weight of a polycarbonate resin derived from 1,1-bis(4-hydroxyphenyl)ethane, the amounts of (A) and (B) being based on the total weight of (A) and (B). The composition has improved impact strength and melt flowability while retaining the excellent transparency and heat deformation resistance of the polycarbonate resin (A).

13 Claims, No Drawings

MIXED POLYCARBONATE RESIN COMPOSITION

This invention relates to a composition comprising a blend of polycarbonate resins, and particularly, to a polycarbonate resin composition comprising a blend of (A) a polycarbonate resin derived from 2,2-bis(4-hydroxyphenyl)propane and (B) a polycarbonate resin derived from 1,1-bis(4-hydroxyphenyl)ethane, which has improved impact strength and melt flowability while advantageously retaining the excellent transparency of the polycarbonate resin (A) and without significantly affecting its heat deformation resistance.

More specifically, this invention relates to a polycarbonate resin composition comprising a blend of (A) a polycarbonate resin derived from 2,2-bis(4-hydroxyphenyl)propane in an amount of 1 to 90% by weight based on the total weight of (A) and (B), and (B) a polycarbonate resin derived from 1,1-bis(4-hydroxyphenyl)ethane in an amount of 10 to 99% by weight based on the total weight of (A) and (B).

A polycarbonate resin derived from 2,2-bis(4-hydroxyphenyl)propane (to be sometimes referred to hereinafter as polycarbonate A) has gained widespread commercial acceptance as engineering plastics. Polycarbonate A has excellent transparency, but its impact strength and melt flowability are not entirely satisfactory. Particularly, its thickness-dependent impact strength is unsatisfactory. For example, a molded article of polycarbonate A has an impact strength, determined by ASTM D256, of at least about 80 kgf-cm/cm$^2$ with a notch width of $\frac{1}{8}$ inch, but not more than about 15 kgf-cm/cm$^2$ with a notch width of $\frac{1}{4}$ inch, and its utility has been limited. It has been desired therefore to improve its thickness-dependent impact strength for its use as a structural material or for the production of machine parts.

Blending of another polymer or copolymer with polycarbonate A has been suggested in an attempt to solve the aforesaid technical problem of polycarbonate A. For example, Japanese Patent Publications Nos. 13663/1965 and 18823/1967 disclose blending of an olefinic polymer or copolymer with polycarbonate A, and Japanese Patent Publications Nos. 15225/1963 and 71/1964 disclose blending of a polymer containing a rubbery component such as a graft polymer with polycarbonate A. These attempts, however, have resulted in sacrificing the good desirable transparency of polycarbonate A owing to the difference in refractive index between polycarbonate A and the resin to be blended with it.

Attempts have, therefore, been made to remove this trouble by incorporating another polymer or copolymer having a refractive index relatively close to that of polycarbonate A (see, for example, Japanese Laid-Open Patent Publications Nos. 1556/1976, 18661/1978 and 147539/1982). These techniques, however, have failed to provide polycarbonate compositions having a combination of high impact strength and excellent transparency because with changes in temperature, the refractive indices of the polycarbonate A and other polymer change and tend to differ by an increasing extent so that the transparency of the blend is reduced.

On the other hand, some proposals are known for blending polycarbonate A with a different polycarbonate.

For example, Japanese Laid-Open Patent Publication No. 26842/1973 (laid open on Apr. 9, 1973) proposed a polycarbonate composition comprising a blend of 1 to 99% by weight of polycarbonate A and 99 to 1% by weight of a polycarbonate resin derived from 1,1-bis(4-hydroxyphenyl)cyclo hexane having the following recurring units

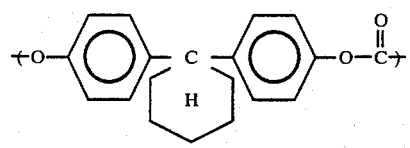

or a copolycarbonate resin derived from 1,1-bis(4-hydroxyphenyl)cyclohexane and 2,2-bis(4-hydroxyphenyl)propane having the following recurring units

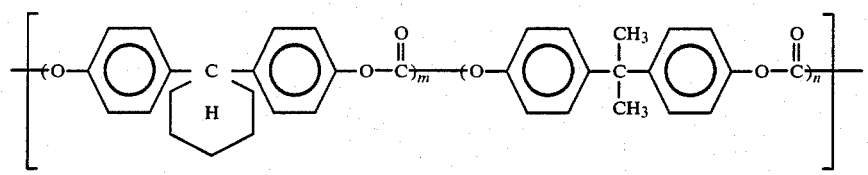

in order to improve the impact strength and heat deformation resistance of polycarbonate A without reducing its transparency and mechanical strength. This patent document neither describes nor suggests the polycarbonate resin composition of this invention comprising a combination of (A) a polycarbonate resin derived from 2,2-bis(4-hydroxyphenyl)propane and (B) a polycarbonate resin derived from 1,1-bis(4-hydroxyphenyl)ethane. Investigations of the present inventors have shown that the composition proposed by the above-cited patent document fails to have the excellent transparency and high Izod impact strength (ASTM D256 with a notch width of $\frac{1}{4}$ inch) of the composition of the present invention, and the proposed composition has an Izod impact strength of 16 kgf-cm/cm$^2$ at the highest with a notch width of $\frac{1}{4}$ inch.

Japanese Laid-Open Patent Publication No. 53942/1974 discloses a polycarbonate composition, similar to that disclosed in the above-cited Japanese Laid-Open Patent Publication No. 26842/1973, which comprises 5 to 95 parts by weight of polycarbonate A and 95 to 5 parts by weight of a polycarbonate resin derived from 1,1-bis(4-hydroxyphenyl)cyclohexane, but fails to describe or suggest the specific polycarbonate composition of this invention and its excellent improved properties.

The present inventors have made investigations in order to develop a composition of polycarbonate resins having improved impact strength and melt flowability while advantageously retaining the excellent transparency and heat deformation resistance of polycarbonate A. These investigations have led to the discovery that a composition comprising a blend of (A) a polycarbonate resin derived from 2,2-bis(4-hydroxyphenyl)propane having the following recurring units

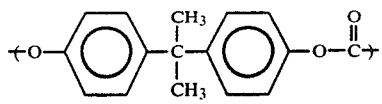

and (B) a polycarbonate resin derived from 1,1-bis(4hydroxyphenyl)ethane having the following recurring units

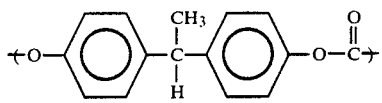

shows excellent transparency and improved impact strength, and removes the defect of the unsatisfactory thicknessdependent impact strength of the polycarbonate resin (A) (i.e., the polycarbonate A).

Investigations of the present inventors have shown that the proportions of the polycarbonate resin (A) and the polycarbonate resin (B) can be varied over a wide range, and based on the total weight of (A) and (B), the proportion of the polycarbonate resin (A) should be 1 to 90% by weight, and the proportion of the polycarbonate resin (B) (to be sometimes referred to as polycarbonate E hereinafter) should be 10 to 99% by weight, and that over the entire range of the above blending proportions of polycarbonate A and polycarbonate E, the transparency of polycarbonate A is substantially retained, and temperature variations do not at all affect the transparency of polycarbonate A.

It has also been found that in a polycarbonate E-rich region, the Izod impact strength of the composition far exceeds that which is anticipated from the proportion of polycarbonate E, and that the heat deformation resistance of the composition is excellent as demonstrated by its heat distortion temperature of at least about 120° C.

It is an object of this invention, therefore, to provide a novel polycarbonate resin composition having improved properties.

The above and other objects and advantages of this invention will become more apparent from the following description.

Polycarbonate A and polycarbonate E and methods for their production are known (see, for example, U.S. Pat. No. 3,275,601), and can be utilized in this invention. Polycarbonate A can be produced, for example, by reacting 2,2-bis(4-hydroxyphenyl)propane with a carbonate precursor such as phosgene or diphenyl carbonate by the known method of U.S. Pat. No. 3,275,601, or is available from the market. Polycarbonate E can be easily produced, for example, by reacting 1,1-(4-hydroxyphenyl)ethane obtained by reacting acetaldehyde with phenol, with a carbonate precursor such as phosgene or diphenyl carbonate by the known method of U.S. Pat. No. 3,275,601. The polycarbonate E as produced by the above method has no crystallizing tendency, and therefore a known gelling method cannot be used to separate it from the reaction solution. It can, however, be separated, for example, by a method comprising pulverizing the reaction product with a kneader having a pulverizing mechanism while removing the solvent, a spray drying method, or a method comprising treating the reaction product in a multivent-equipped extruder. The resulting solid polycarbonate E can be molded by injection molding, extrusion molding, compression molding, powder molding, etc. as in the case of the known polycarbonate A. A molded article of polycarbonate E has an Izod impact strength, determined by ASTM D256 (notch width ¼ inch), of about 90 kgf-cm/cm² which far exceeds that (about 15 kgf-cm/cm²) of polycarbonate A.

Preferably, the polycarbonates A and E used in this invention have an average molecular weight (calculated for polycarbonate A) of 15,000 to 40,000.

The average molecular weight (calculated for polycarbonate A) denotes the value $\overline{M}$ computed from the following equation.

$$[\eta] = 1.23 \times 10^{-4} M^{0.83}$$

wherein $[\eta]$ is the intrinsic viscosity measured at 20° C. using methylene chloride as a solvent.

In the present invention, the polycarbonates A and E may contain a component which is derived from another copolymerizable monomer and which does not impair the improving effect of this invention. Such a comonomer may be selected from other dihydric phenols and organic dicarboxylic acids in an amount of up to 20 mole %. Specific examples include dihydric phenols such as hydroquinone, dihydroxydiphenyl, bis(hydroxyphenyl)alkanes, bis(hydroxyphenyl)cycloalkanes, bis(hydroxyphenyl) ether, bis(hydroxyphenyl) sulfide and bis(hydroxyphenyl) sulfone; nuclearly substituted derivatives thereof having such a substituent as halogen or a lower alkyl group; and organic dicarboxylic acids such as terephthalic acid and isophthalic acid.

The composition of this invention can be prepared by mixing polycarbonate A with polycarbonate E by any method which can effect uniform mixing of the two polycarbonates. For example, a solvent solution of polycarbonate A is mixed with a solvent solution of polycarbonate E, and the solvent is then removed from the mixture. Alternatively, polycarbonate A in the solid state and polycarbonate E in the solid state are melt-mixed and extruded into pellets. In the former method of mixing, methylene dichloride, chlorobenzene and tetrahydrofuran, for example, may be used as the solvent. In the latter method of mixing, the melt-mixing temperature may be about 230° to about 300° C.

The proportion of polycarbonate E in the composition of this invention is 10 to 99% by weight, preferably 30 to 99% by weight, more preferably 60 to 99% by weight. If it is less than 10% by weight, the resulting composition has an Izod impact strength of as low as about 15 kgf-cm/cm² (¼ inch notch width), and no effect of adding polycarbonate E is obtained. When the proportion of polycarbonate E is 60 to 99% by weight, the Izod impact strength of the resulting composition at ¼ inch notch width is as high as at least about 80 kgf-cm/cm². When the proportion of polycarbonate E is 30 to less than 60% by weight, the impact strength is about 30 to 80 kgf-cm/cm², and when the proportion polycarbonate E is 10% by weight to less than 30% by weight, the impact strength is about 20 to 30 kgf-cm/cm². In these ranges, however, the impact strength of the composition is still much higher than that (about 15 kgf-cm/cm²) of polycarbonate A alone.

The composition of this invention is transparent irrespective of the mixing proportions of the two polycarbonates, and the transparency is not affected by temperature.

The composition of this invention comprising polycarbonates A and E may contain additives. The amount of the additives may be properly selected depending upon the types of the additives, purpose of addition, etc. For example, the additives may be incorporated in an amount of up to about 15% by weight based on the total weight of (A) and (B). Examples of such additives are other resins which are compatible with polycarbonates A and E, heat stabilizers, antioxidants, ultraviolet absorbers, mold releasing agents, coloring agents and fire retardants.

Specific examples of the other resins are polystyrene and polyesters.

Specific examples of the heat stabilizers are triphenyl phosphite, tris-(2,6-dimethylphenyl)phosphite, tris-(mixed mono- and di-nonylphenyl)phosphite, dimethylbenzene phosphonate and trimethyl phosphate.

Specific examples of the antioxidants are octadecyl-3-(3,5-di-tert-butyl-4-hydroxyphenyl)propionate and pentaerythrityl-tetrakis[ 3-(3,5-di-tert-butyl-4-hydroxyphenyl)propionate].

Specific examples of the ultraviolet absorbers are 2-(2-hydroxy-5-methylphenyl)benzotriazole, 2-(2-hydroxy-5-tert octylphenyl)benzotriazole and 2-hydroxy-4-n-octoxy-benzophenone.

Specific examples of the mold releasing agents are stearyl stearate, beeswax, montan wax, paraffin wax and glyceryl stearate.

The coloring agents may be various organic dyes.

Specific examples of the fire retardants are 2,2-bis(3,5-dibromo-4-hydroxyphenyl)propane, oligocarbonates thereof, and hexabromocyclododecane.

Based on the total weight of polycarbonate resins (A) and (B), the amounts of these additives may, for example, be 1 to 10% by weight for the other resins, 0.001 to 0.1% by weight for the heat stabilizers, 0.01 to 0.2% by weight for the antioxidants, 0.1 to 0.7% by weight for the ultraviolet absorbers, 0.1 to 1% by weight for the mold releasing agents, 0.005 to 0.5% by weight for the coloring agents, and 0.1 to 10% by weight for the fire retardants.

The composition of this invention is useful as a structural material and machine parts which require transparency and impact strength because it has excellent transparency, much higher impact strength than polycarbonate A, and a heat distortion temperature of at least about 120° C.

The composition of this invention may be in the form of a molding composition or in the form of a molded article. Molded articles may be produced by molding the composition of this invention in the form of a molding composition by known molding techniques. For example, it can be molded at 230° to 350° C. by injection molding extrusion molding and compression molding.

The following examples illustrate the present invention more specifically. The various properties in these examples were measured by the following methods.

Transparency

The total light transmittance, Ti, of a molded plate having a thickness of 2 mm is measured by using an integral spherical light transmittance measuring device (made by Nihon Seimitsu Kogaku K. K.) in accordance with ASTM D1003. Larger Ti values show better transparency.

Impact strength

Pre-dried pellets of the composition are molded into an impact test specimen having a size of 64 mm×12.7 mm ×6.35 mm by an injection molding machine. A notch of 0.25 mmR is provided in the specimen and the specimen is conditioned for 24 hours at a temperature of 230° C. and a humidity of 50%. The notched Izod impact strength of the specimen is then measured by an Izod impact tester (made by Toyo Seiki K. K.) in accordance with ASTM D256. Larger measured values show higher impact strength.

Heat deformation resistance

Measured under a load of 18.6 kgf/cm$^2$ in accordance with ASTM D648. Larger measured values show better heat deformation resistance.

Melt flowability

Measured at 280° C. under a load of 2160 kgf for 10 minutes in accordance with ASTM D1238. Larger measured values show better melt flowability.

EXAMPLES 1–4 AND COMPARATIVE EXAMPLES 1-2

Flaky polycarbonate from 1,1-bis(4-hydroxyphenyl)ethane (polycarbonate E, average molecular weight 23000) and powdery polycarbonate from 2,2-bis(4-hydroxyphenyl)propane (polycarbonate A, average molecular weight 25000) were mixed in the proportions indicated in Table 1 at room temperature and pelletized by an extruder having a screw diameter of 30 mm (model VSK-30 made by Chuo Kikai K. K.) and kept at 280° C. The resulting pellets were molded and the impact strengths (notch width ¼ inch) of the molded articles were measured by the method described hereinabove. The results are shown in Table 1.

TABLE 1

| Example (Ex.) or Comparative Example (CEx.) | Mixing proportions (wt. %) | | Izod impact strength (kgf-cm/cm$^2$) |
|---|---|---|---|
| | Polycarbonate E | Polycarbonate A | |
| EX. 1 | 90 | 10 | 89 |
| Ex. 2 | 60 | 40 | >90 |
| Ex. 3 | 30 | 70 | 30 |
| Ex. 4 | 10 | 90 | 23 |
| CEx. 1 | 0 | 100 | 14 |
| CEx. 2 | 5 | 95 | 15 |

EXAMPLES 5–8 AND COMPARATIVE EXAMPLE 3

Flaky polycarbonate E having an average molecular weight of 20,000 and powdery polycarbonate A having an average molecular weight of 21,000 were mixed in the proportions indicated in Table 2 at room temperature and pelletized by an extruder having a screw diameter of 30 mm (Model VSK-30 made by Chuo Kikai K. K.) and kept at 270° C. The melt flowability (MFR), heat deformation resistance and impact strength of the pellets were evaluated by the methods described hereinabove. The results are shown in Table 2.

Furthermore, the pellets were injection molded to form test specimens having a size of 63 mm×49 mm×2 mm, and the total light transmittances of the specimens were measured by the method described hereinabove. The results are also shown in Table 2.

TABLE 2

| Example (Ex.) or Comparative Example (CEx.) | Mixing proportions (wt. %) Polycarbonate E | Mixing proportions (wt. %) Polycarbonate A | MFR (g) | Total light transmittance Ti (%) | Heat deformation resistance (°C.) | Izod impact strength (kgf-cm/cm²) |
|---|---|---|---|---|---|---|
| EX. 5 | 80 | 20 | 25.2 | 90.2 | 122 | 84 |
| Ex. 6 | 60 | 40 | 22.1 | 90.3 | 126 | 81 |
| Ex. 7 | 50 | 50 | 21.0 | 90.3 | 129 | 80 |
| Ex. 8 | 30 | 70 | 17.5 | 90.2 | 132 | 32 |
| CEx. 3 | 0 | 100 | 13.0 | 90.3 | 134 | 10 |

We claim:

1. A composition comprising a blend of
   (A) 1 to 70% by weight of polycarbonate resin derived from 2,2-bis(4-hydroxyphenyl)propane based on the total weight of (A) and (B), and
   (B) 30 to 90% by weight of a polycarbonate resin derived from 1,1-bis(4-hydroxyphenyl)ethane based on the total weight of (A) and (B).

2. The composition of claim 1 wherein the polycarbonate resin (A) and the polycarbonate resin (B) each have an average molecular weight $\overline{M}$ of 15,000 to 40,000 computed from the following equation;

$$[\eta] = 1.23 \times 10^{-4} M^{0.83}$$

wherein $[\eta]$ is the intrinsic viscosity measured at 20° C. using methylene chloride as a solvent.

3. The composition of claim 1 which has an Izod impact strength, determined by ASTM D256 with a notch width of ¼ inch, of at least 20 kgf-cm/cm².

4. The composition of claim 1, which further comprises more than 0% and up to 15% by weight based on the total weight of (A) and (B), of at least one additive.

5. The composition of claim 1, wherein at least one of the polycarbonate resin (A) and the polycarbonate resin (B) contains more than 0 mole % and up to 20 mole % of a component derived from another copolymerizable monomer, said monomer selected from the group consisting of dihydric phenols other than said 2,2-bis(4-hydroxyphenyl)propane and 1,1-bis(4-hydroxyphenyl)ethane.

6. The composition of claim 1 wherein at least one of the polycarbonate resin (A) and the polycarbonate resin (B) contains more than 0 mole % and up to 20 mole % of a component derived from another copolymerizable monomer, said monomer selected from the group consisting of organic dicarboxylic acids.

7. The composition of claim 4 wherein the additive comprises 1 to 10% by weight of another resin.

8. The composition of claim 4 wherein the additive comprses 0.001 to 0.1% by weight of a heat stabilizer.

9. The composition of claim 4 wherein the additive comprises 0.01 to 0.2% by weight of an antioxidant.

10. The composition of claim 4 wherein the additive comprises 0.1 to 0.7% by weight of an ultraviolet absorber.

11. The composition of claim 4 wherein the additive comprises 0.1 to 1% by weight of a mold releasing agent.

12. The composition of claim 4 wherein the additive comprises 0.005 to 0.5% by weight of a coloring agent.

13. The composition of claim 4 wherein the additive comprises 0.1 to 10% by weight of a fire retardant.

* * * * *